(12) United States Patent
Levi et al.

(10) Patent No.: US 11,476,928 B2
(45) Date of Patent: Oct. 18, 2022

(54) TDMA NETWORKING USING COMMODITY NIC/SWITCH

(71) Applicant: Mellanox Technologies, Ltd., Yokneam (IL)

(72) Inventors: Dotan David Levi, Kiryat Motzkin (IL); Avi Urman, Yokneam Illit (IL); Lior Narkis, Petah-Tikva (IL); Liron Mula, Ramat Gan (IL); Paraskevas Bakopoulos, Ilion (GR); Ariel Almog, Kohav Yahir (IL); Roee Moyal, Yokneam Illit (IL); Gal Yefet, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 72 days.

(21) Appl. No.: 16/921,993

(22) Filed: Jul. 7, 2020

(65) Prior Publication Data

US 2021/0297151 A1  Sep. 23, 2021

(30) Foreign Application Priority Data

Mar. 18, 2020  (GR) ............................... 20200100141

(51) Int. Cl.
*H04B 7/26* (2006.01)
*H04L 49/351* (2022.01)
(Continued)

(52) U.S. Cl.
CPC ......... *H04B 7/2646* (2013.01); *H04L 49/351* (2013.01); *H04L 49/90* (2013.01); *H04W 72/0446* (2013.01); *H04W 74/08* (2013.01)

(58) Field of Classification Search
CPC ..... H04B 7/2646; H04L 49/351; H04L 49/90; H04W 72/0446; H04W 74/08

USPC .......................................................... 370/329
See application file for complete search history.

(56) References Cited

U.S. PATENT DOCUMENTS 6,212,197 B1  4/2001  Christensen et al.
6,564,267 B1  5/2003  Lindsay
(Continued)

FOREIGN PATENT DOCUMENTS

AU   2012216611 B2    3/2013
AU   2012216611 B2 *  1/2017   ............ H04J 3/0673
(Continued)

OTHER PUBLICATIONS

EP Application # 21181591.5 Search Report dated Sep. 17, 2021.
(Continued)

*Primary Examiner* — Yemane Mesfin
*Assistant Examiner* — Intekhaab A Siddiquee
(74) *Attorney, Agent, or Firm* — Kligler & Associates Patent Attorneys Ltd

(57) ABSTRACT

A network element one or more network ports, network time circuitry and packet processing circuitry. The network ports are configured to communicate with a communication network. The network time circuitry is configured to track a network time defined in the communication network. In some embodiments the packet processing circuitry is configured to receive a definition of one or more timeslots that are synchronized to the network time, and to send outbound packets to the communication network depending on the timeslots. In some embodiments the packet processing circuitry is configured to process inbound packets, which are received from the communication network, depending on the timeslots.

16 Claims, 5 Drawing Sheets

(51) Int. Cl.
*H04L 49/90* (2022.01)
*H04W 72/04* (2009.01)
*H04W 74/08* (2009.01)

(56) References Cited

U.S. PATENT DOCUMENTS

| | | | |
|---|---|---|---|
| 6,816,492 B1 | 11/2004 | Turner et al. | |
| 6,954,432 B1* | 10/2005 | Bychowsky | H04W 56/00 |
| | | | 370/236 |
| 7,224,669 B2 | 5/2007 | Kagan et al. | |
| 7,245,627 B2 | 7/2007 | Goldenberg et al. | |
| 7,676,597 B2 | 3/2010 | Kagan et al. | |
| 8,370,675 B2 | 2/2013 | Kagan | |
| 9,390,056 B1 | 7/2016 | Noureddine et al. | |
| 9,397,960 B2 | 7/2016 | Arad et al. | |
| 9,450,846 B1 | 9/2016 | Huang et al. | |
| 9,667,446 B2 | 5/2017 | Worrell | |
| 10,027,601 B2 | 7/2018 | Narkis et al. | |
| 10,187,400 B1 | 1/2019 | Castro et al. | |
| 10,284,383 B2 | 5/2019 | Bloch et al. | |
| 10,320,508 B2 | 6/2019 | Shimizu et al. | |
| 10,727,966 B1 | 7/2020 | Izenberg et al. | |
| 2003/0002483 A1* | 1/2003 | Zwack | H04J 3/0673 |
| | | | 370/352 |
| 2004/0174820 A1 | 9/2004 | Ricciulli | |
| 2006/0007862 A1 | 1/2006 | Sayeedi et al. | |
| 2006/0153179 A1 | 7/2006 | Ho et al. | |
| 2008/0298380 A1 | 12/2008 | Rittmeyer et al. | |
| 2012/0201248 A1* | 8/2012 | Aoki | H04L 1/1809 |
| | | | 370/394 |
| 2013/0027611 A1 | 1/2013 | Closset | |
| 2014/0092918 A1 | 4/2014 | Jost | |
| 2014/0379714 A1 | 12/2014 | Hankins | |
| 2015/0046741 A1 | 2/2015 | Yen et al. | |
| 2015/0055508 A1 | 2/2015 | Ashida et al. | |
| 2015/0318015 A1 | 11/2015 | Bose et al. | |
| 2017/0171362 A1 | 6/2017 | Bolotov et al. | |
| 2017/0331926 A1 | 11/2017 | Raveh et al. | |
| 2018/0124812 A1* | 5/2018 | Thubert | H04B 1/713 |
| 2018/0191629 A1* | 7/2018 | Biederman | H04L 47/6225 |
| 2019/0056972 A1 | 2/2019 | Zhou et al. | |
| 2019/0087352 A1 | 3/2019 | Lee et al. | |
| 2019/0087652 A1 | 3/2019 | Townsend et al. | |
| 2019/0124524 A1 | 4/2019 | Gormley | |
| 2019/0149365 A1 | 5/2019 | Chatterjee et al. | |
| 2019/0319730 A1 | 10/2019 | Webb et al. | |
| 2019/0379714 A1 | 12/2019 | Levi et al. | |
| 2020/0026656 A1 | 1/2020 | Liao et al. | |
| 2020/0252320 A1 | 8/2020 | Zemach et al. | |
| 2020/0259759 A1 | 8/2020 | Shalev et al. | |
| 2021/0081352 A1 | 3/2021 | Yang et al. | |

FOREIGN PATENT DOCUMENTS

| | | |
|---|---|---|
| CN | 103354989 A | 10/2013 |
| EP | 0607412 B1 | 1/1999 |
| JP | 2005529523 A | 9/2005 |
| JP | 2007042145 A | 2/2007 |
| WO | 9418627 A2 | 8/1994 |
| WO | 9857497 A1 | 12/1998 |
| WO | 2001037489 A1 | 5/2001 |
| WO | 2010117359 A1 | 10/2010 |

OTHER PUBLICATIONS

Baboescu et al., "Scalable Packet Classification," Proceedings of SIGCOMM'01, ACM, pp. 199-210, year 2001.
Bader et al., "Survey and Comparison of Open Source Time Series Databases," BTW 2017, Workshopband, Lecture Notes in Informatics (LNI), Gesellschaft fuer Informatik, Bonn, pp. 249-268, year 2017.
Davie et al., "An Expedited Forwarding PHB (Per-Hop-Behavior)", RFC 3246, Network Working Group, pp. 1-32, Mar. 2002.
Yau et al., "Development of Situation-Aware Application Software for Ubiquitous Computing Environments," Proceedings of the 26th Annual International Computer Software and Applications Conference (COMSAC'02), IEEE Computer Society, pp. 1-6, year 2002.
U.S. Appl. No. 16/782,075 Office Action dated Apr. 5, 2021.
Mills, "Network Time Protocol (Version 1): Specification and Implementation," RFC 1059, pp. 2-59, Jul. 1988.
Mills, "Internet Time Synchronization: The Network Time Protocol," IEEE Transactions on Communication, vol. 39, No. 10, pp. 1482-1493, Oct. 1991.
Mills, "Network Time Protocol (Version 3): Specification, Implementation and Analysis," RFC 1305, pp. 1-96, Mar. 1992.
Mills, "Network Time Protocol (NTP)," RFC 0958, pp. 2-15, Sep. 1985.
IEEE Standard 1588-2008, "IEEE Standard for a Precision Clock Synchronization Protocol for Networked Measurement and Control Systems", pp. 1-289, year 2008.
Weibel et al., "Implementation and Performance of Time Stamping Techniques", 2004 Conference on IEEE 1588, pp. 1-29, Sep. 28, 2004.
InfiniBandTM Architecture Specification vol. 1, Release 1.2.1,pp. 1-1727, Nov. 2007.
Lu et al., "A Fast CRC Update Implementation", Computer Engineering Laboratory, Electrical Engineering Department, pp. 113-120, Oct. 8, 2003.
Mellette et al., "Toward Optical Switching in the Data Center", IFFF 19th International Conference on High Performance Switching and Routing (HPSR), pp. 1-6, Bucharest, Romania, Jun. 18-20, 2018.
Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.
O-RAN Alliance, "O-RAN Fronthaul Working Group; Control, User and Synchronization Plane Specification", ORAN-WG4.CUS. 0-v01.00, Technical Specification, pp. 1-189, year 2019.
Vattikonda et al., "Practical TDMA for Datacenter Ethernet", EuroSys conference, Bern, Switzerland, pp. 225-238, Apr. 10-13, 2012.
Ericsson AB et al., "Common Public Radio Interface: eCPRI Interface Specification", V2.0, pp. 1-109, May 10, 2019.
Xilinx Inc., "Radio over Ethernet Framer v2.1", PB056 (v2.1), pp. 1-9, Oct. 30, 2019.
Weibel, H., "High Precision Clock Synchronization according to IEEE 1588 Implementation and Performance Issues", Zurich University of Applied Sciences, pp. 1-9, Jan. 17, 2005.
Sanchez-Palencia, J., "[RFC,v3,net-next,00/18] Time based packet transmission", pp. 1-14, Mar. 7, 2018.
IEEE Std 802.1Qaz™, "IEEE Standard for Local and metropolitan area networks—Media Access Control (MAC) Bridges and Virtual Bridged Local Area Networks—Amendment 18: Enhanced Transmission Selection for Bandwidth Sharing Between Traffic Classes", IEEE Computer Society, pp. 1-110, Sep. 30, 2011.
Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.
Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.
Wikipedia, Precision Time Protocol, pp. 1-9, Apr. 20, 2020.
SMPTE Standard, "Professional Media Over Managed IP Networks:Traffic Shaping and Delivery Timing for Video", The Society of Motion Picture and Television Engineers, pp. 1-17, Nov. 22, 2017.
Wikipedia, "Time-Sensitive Networking", pp. 1-12, Mar. 5, 2020.
Levi et al., U.S. Appl. No. 16/782,075, filed Feb. 5, 2020.
U.S. Appl. No. 16/782,075 Office Action dated Oct. 5, 2020.
U.S. Appl. No. 16/910,193 Office Action dated Jul. 7, 2021.
U.S. Appl. No. 16/910,193 Office Action dated Dec. 17, 2021.
U.S. Appl. No. 17/359,667 Office Action dated Jul. 5, 2022.

* cited by examiner

TDMA NETWORKING USING COMMODITY NIC/SWITCH

FIELD OF THE INVENTION

The present invention relates generally to computer networks, and particularly to Time-Division-Multiplexing (TDM) and Time-Division-Multiple-Access (TDMA) communication over networks.

BACKGROUND OF THE INVENTION

Various techniques for enforcing Time-Division-multiplexing (TDM) discipline in networks such as Ethernet are known in the art. For example, in "Practical TDMA for Datacenter Ethernet", published by the Department of Computer Science and Engineering, University of California, San Diego, April, 2012, Vattikonda et al. describe a design and implementation of a TDMA medium access control (MAC) layer for commodity Ethernet hardware that allows end hosts to dispense with TCP's reliability and congestion control.

In another example, U.S. Patent Application Publication 2019/0319730 describes techniques to operate a Time Division Multiplexing (TDM) MAC module, including examples of facilitating use of shared resources allocated to ports of a network interface based on a timeslot mechanism, wherein the shared resources are allocated to packet data received or sent through the ports of the network interface.

SUMMARY OF THE INVENTION

An embodiment of the present invention that is described herein provides a network element including one or more network ports, network time circuitry and packet processing circuitry. The network ports are configured to communicate with a communication network. The network time circuitry is configured to track a network time defined in the communication network. The packet processing circuitry is configured to receive a definition of one or more timeslots that are synchronized to the network time, and to send outbound packets to the communication network depending on the timeslots.

In some embodiments, the one or more timeslots include a plurality of timeslots that are assigned to the network element in a periodic time schedule that is synchronized to the network time. In an embodiment, the packet processing circuitry is configured to send the outbound packets only during the one or more timeslots. In another embodiment, the packet processing circuitry is configured to generate a series of dummy packets, to record network times corresponding to egress of the dummy packets, and to send the outbound packets to the communication network depending on the one or more timeslots and on the recorded network times.

In some embodiments, the network ports are configured to send the outbound packets to a wireless network operating in Time-Division Multiple Access (TDMA). In other embodiments the network ports are configured to send the outbound packets to an optical switching network operating in TDMA. In some embodiments, in addition to sending the outbound packets depending on the timeslots, the packet processing circuitry is configured to send additional packets to the communication network independently of the timeslots. In some embodiments, the outbound packets include Ethernet packets or Infiniband packets.

There is additionally provided, in accordance with an embodiment of the present invention, a network element including one or more network ports, network time circuitry and packet processing circuitry. The network ports are configured to communicate with a communication network. The network time circuitry is configured to track a network time defined in the communication network. The packet processing circuitry is configured to receive a definition of one or more timeslots that are synchronized to the network time, and to process inbound packets, which are received from the communication network, depending on the timeslots.

In an example embodiment, the packet processing circuitry is configured to process an inbound packet only if an arrival time of the inbound packet is during the one or more timeslots.

There is also provided, in accordance with an embodiment of the present invention, a network element including one or more network ports, network time circuitry and packet processing circuitry. The network ports are configured to communicate with a communication network. The network time circuitry is configured to track a network time defined in the communication network. The packet processing circuitry is configured to queue outbound packets in one or more queues, to assign credits to the queues depending on the network time, and to transmit the outbound packets to the communication network in accordance with the assigned credits.

There is further provided, in accordance with an embodiment of the present invention, a network element including one or more network ports, network time circuitry and packet processing circuitry. The network ports are configured to communicate with a communication network. The network time circuitry is configured to track a network time defined in the communication network. The packet processing circuitry is configured to queue outbound packets pending for transmission to the communication network, and to transmit a pending outbound packet to the communication network synchronously with an event that is defined in accordance with the network time.

There is moreover provided, in accordance with an embodiment of the present invention, a network element including one or more network ports, network time circuitry and packet processing circuitry. The network ports are configured to communicate with a communication network. The network time circuitry is configured to track a network time defined in the communication network. The packet processing circuitry is configured to transmit outbound packets to the communication network, and to stop transmission of an outbound packet at a specified time in accordance with the network time.

There is additionally provided, in accordance with an embodiment of the present invention, a network element including one or more network ports, network time circuitry and packet processing circuitry. The network ports are configured to communicate with a communication network. The network time circuitry is configured to track a network time defined in the communication network. The packet processing circuitry is configured to receive inbound packets from the communication network, to determine times-of-arrival of the inbound packets, in accordance with the network time, and to distribute the inbound packets to multiple queues based on the times-of-arrival.

There is also provided, in accordance with an embodiment of the present invention, a method for communication including, in a network element connected to a communication network, tracking a network time defined in the communication network. A definition of one or more timeslots, which are synchronized to the network time, is received. Outbound packets are sent from the network element to the communication network, depending on the timeslots.

There is additionally provided, in accordance with an embodiment of the present invention, a method for communication including, in a network element connected to a communication network, tracking a network time defined in the communication network. A definition of one or more timeslots, which are synchronized to the network time, is received. Inbound packets, which are received from the communication network, are processed depending on the timeslots.

There is additionally provided, in accordance with an embodiment of the present invention, a method for communication including, in a network element connected to a communication network, tracking a network time defined in the communication network. Outbound packets are queued in one or more queues. Credits are assigned to the queues depending on the network time. The outbound packets are transmitted from the network element to the communication network in accordance with the assigned credits.

There is further provided, in accordance with an embodiment of the present invention, a method for communication including, in a network element connected to a communication network, tracking a network time defined in the communication network. Outbound packets, pending for transmission to the communication network, are queued. A pending outbound packet is transmitted from the network element to the communication network synchronously with an event that is defined in accordance with the network time.

There is additionally provided, in accordance with an embodiment of the present invention, a method for communication including, a network element connected to a communication network, tracking a network time defined in the communication network. Outbound packets are transmitted from the network element to the communication network. Transmission of an outbound packet stopped at a specified time in accordance with the network time.

There is also provided, in accordance with an embodiment of the present invention, a method for communication including, a network element connected to a communication network, tracking a network time defined in the communication network. Inbound packets are received in the network element from the communication network. Times-of-arrival of the inbound packets are determined in accordance with the network time. The inbound packets are distributed to multiple queues based on the times-of-arrival.

The present invention will be more fully understood from the following detailed description of the embodiments thereof, taken together with the drawings in which:

DETAILED DESCRIPTION OF EMBODIMENTS

Overview

Figure 1:
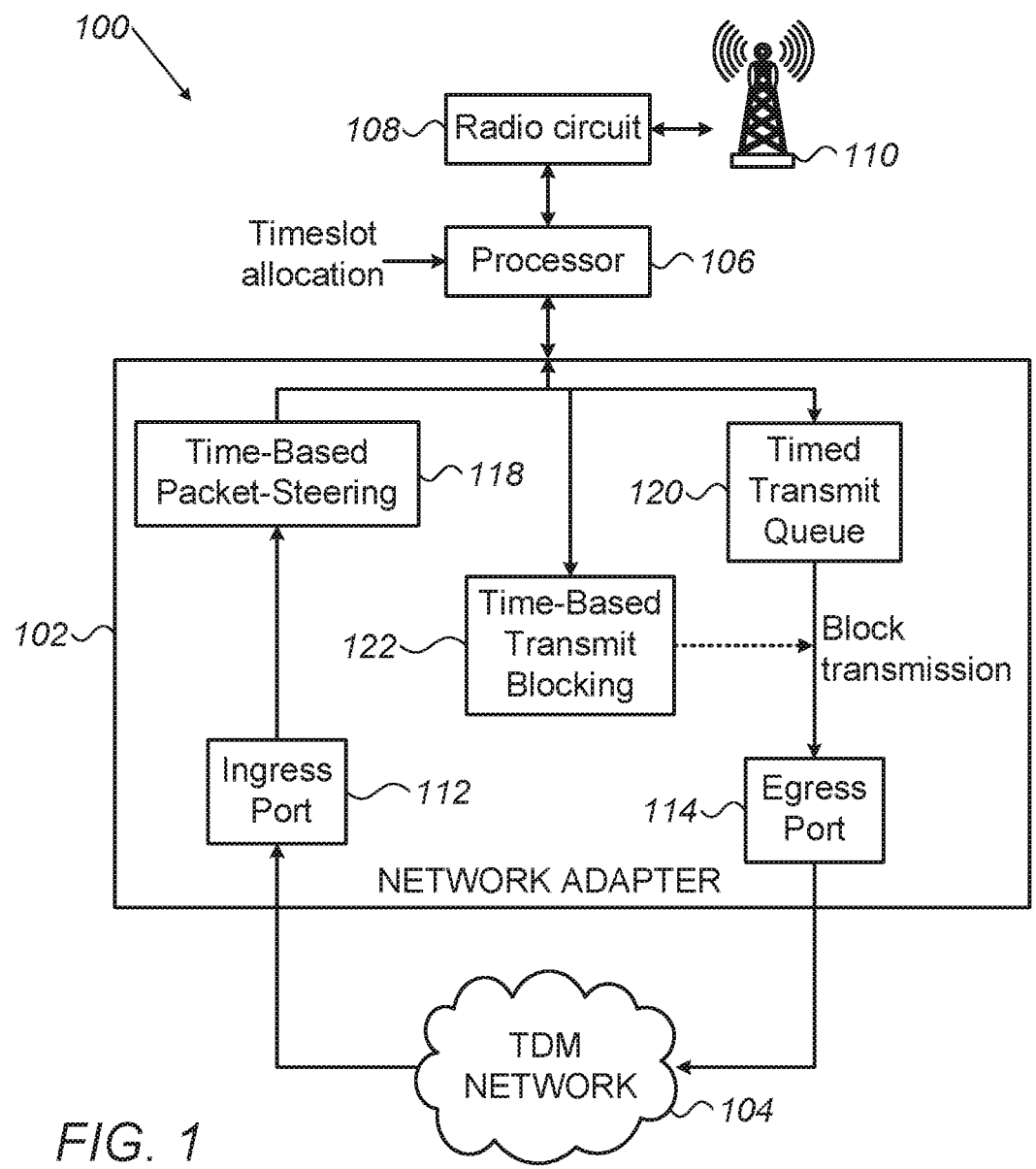
FIG. 1 is a block diagram that schematically illustrates a Time-Division Multiple Access (TDM) node in a radio access network, in accordance with an embodiment of the present invention.

Communication Networks such as Enhanced Common Public Radio Interface (eCPRI), Optical Data center Network (ODCN), video over IP (e.g., Society of Motion Picture and Television Engineers (SMPTE) 2110) and others, use Time Division Multiplex (TDM) or, sometimes, Time-Division-Multiple Access (TDMA) for communicating between endpoints, wherein a plurality of data sources share the same physical medium during different time intervals, which are referred to as timeslots.

eCPRI Is described, for example, in eCPRI Specification V2.0 (2019-05-10), by Ericsson AB, Huawei Technologies Co. Ltd, NEC Corporation and Nokia. Optical datacenter networks are described, for example, in "NEPHELE: an end-to-end scalable and dynamically reconfigurable optical architecture for application-aware SDN cloud datacenters," IEEE Communications Magazine (Volume: 56, Issue: 2, February 2018. DOI: 10.1109/MCOM2018.1600804), by Paraskevas Bakopoulos et al.

TDMA multiplexing in high performance networks requires good synchronization between the end points, which is usually achieved by high precision time bases. Specialized circuitry, such as that described by Xilinx RoE Framer IP documentation (Xilinx PB056 (v2.1) Oct. 30, 2019) may also be used to send and receive data in TDM network; however, such specialized circuitry may be expensive and inflexible.

Embodiments of the present invention that are disclosed herein provide network-time dependent network communications using network elements, including inexpensive network adapters such as Network Interface Controllers (NICs) in the context of Ethernet™, or Host Channel Adapters (HCAs) in the context of InfiniBand. While the description hereinbelow refers mainly to network adapters, the disclosed techniques are not limited to network adapters, and may be used with any suitable network elements, including, for example, switches and routers.

In some embodiments described herein, a network element (e.g., network adapter, switch, router or the like) comprises one or more network ports for communicating with a communication network, network time circuitry, and packet processing circuitry. The network time circuitry is configured to track a network time defined in the communication network.

In some embodiments, the packet processing circuitry is configured to receive a definition of one or more timeslots that are synchronized to the network time, and to send outbound packets to the communication network, or process inbound packets that are received from the communication network, depending on the timeslots.

In an example embodiment, the packet processing circuitry is configured to queue outbound packets in one or more queues, to assign credits to the queues depending on the network time, and to transmit the outbound packets to the communication network in accordance with the assigned credits.

In another example embodiment, the packet processing circuitry is configured to transmit a pending outbound packet to the communication network synchronously with an event that is defined in accordance with the network time.

In yet another embodiment, the packet processing circuitry is configured to stop transmission of an outbound packet at a specified time in accordance with the network time.

In some embodiments, the packet processing circuitry is configured to receive inbound packets from the communication network, to determine times-of-arrival of the inbound packets, in accordance with the network time, and to distribute the inbound packets to multiple queues based on the times-of-arrival.

In another example embodiment, the packet processing circuitry is configured to receive one or more time-slot allocations that are assigned to the network element in a TDM schedule that is synchronized to the network time. The packet processing circuitry sends outbound packets to the communication network, and/or processes inbound packets that are received from the communication network, only during the timeslot allocations assigned to the network element.

In other words, in some embodiments certain TDM schedule is defined across at least part of the communication network. As part of this TDM schedule, a certain network element is assigned specific timeslots. In some embodiments the network element is permitted to send packets to the network (often to a pre-assigned destination) only during the assigned timeslots. Additionally or alternatively, in some embodiments the network element is permitted to process received packets only if the packet arrival times match the assigned timeslots. This mechanism is useful, for example, for interacting with a wireless or optical switching networks that operates in TDMA. Examples of such use-cases are described below.

In some embodiments the network element may send the packet to a specific software entity, such as a queue, responsive to the time in which the network element receives the packet.

According to an example embodiment, a network adapter comprises one or more Ingress ports that receive TDM transmissions over an. Ethernet network; the network adapter generates timestamps that correspond to the arrival time of the ingress packets, classifies the packets according to the timestamps and to other packet information (such as various headers), and, responsive to the classification, forwards packets to a host processor that is attached to the network adapter (will be referred to hereinbelow as "the processor" or "the host").

According to embodiments, the network adapter may further comprise one or more Egress ports; the network adapter receives packets from the processor and sends the packets in pre-defined timeslots to the Egress ports.

In some embodiments, the reception and/or the transmission of TDM-based packets require a precision time-base, which is derived from a high-precision clock that the network adapter comprises. In an embodiment, the network adapter comprises a clock that is frequency and phase locked to the network timeline, and the processor comprises a main clock ("wall clock") that is configured to track the network adapter clock. This reduces the real-time workload of the processor.

In an embodiment, the network adapter comprises a Precision Time Protocol (PTP) clock that synchronizes to the network timeline, and supports commands such as "adjust time" and "set time", As implemented in Linux Community open source PTP daemon-PTP41, and defined, for example, in "Standard for a Precision Clock Synchronization Protocol for Networked Measurement and Control Systems" (IEEE 1588-2008). In some embodiments, the network adapter further comprises a syntonization circuit, which continuously adjusts the frequency source of the network adapter to the frequency source of the time-base of the network and supports commands such as "adjust frequency" and "set frequency". Certain aspects of Network adapters having on-board PTP clocks are addressed, for example, in U.S. patent application Ser. No. 16/779,611, filed Feb. 2, 2020, and in U.S. patent application Ser. No. 16/782,075, filed Feb. 5, 2020, which are both assigned to the assignee of the present patent application and whose disclosures are incorporated herein by reference.

According to some embodiments, to send packets at precisely predefined timeslots, the network adapter sends an evenly spaced infinite sequence of dummy packets (that typically do not egress the network adapter). Whenever a packet is sent, the network adapter sends a Completion Queue Entry (CQE), comprising a timestamp (which may be derived from, the high-precision clock described above) and a Producer Index (PI), to the processor and to a loop-back circuitry that is used to time outgoing packets. Each PI directly corresponds to a different time and can be used to specify a precise time. The processor sends packets to be transmitted to various queues within the network adapter (e.g., each virtual machine in the processor sends packets to a different queue), and adds "wait-for-PI" messages to the packets; thus, the processor precisely controls the timeslot at which the network adapter sends the packet from the egress port. In some embodiments, the network element further comprises a time-based circuitry that blocks any packet that the egress circuitry may attempt to send to the network out the allocated times tot (for example, due to a software error or backpressure from the network or any other reason).

According to an embodiment, the network adapter comprises a packet steering circuitry, which is configured to steer packets by matching a set of parameters to predefined values, the set of parameters comprising a Time-of-Arrival parameter. To receive a packet in a predefined timeslot, the network adapter timestamps the ingress packets (for example, using the high precision clock described above). The processor then controls the packet steering circuitry to match a timing parameter that corresponds to the allocated timeslot of TDM packets. In some embodiments, the packet steering circuitry is configured to match the timeline value to a range of values.

Note that any of the disclosed time-dependent techniques may be applied to all packets, or to a selected subset of packets, e.g., packets associated with one or more specified ports or flows.

System Description

FIG. 1 is a block diagram that schematically illustrates a Time-Division Multiplex (TDM) node 100 in a radio access network, in accordance with an embodiment of the present invention. Node 10U comprises a Network Adapter that communicates with a TDM Network 104, a processor 106, a radio circuit 108 and a cellular antenna (or antennae array) 110. Radio Circuit 108 communicates wirelessly through antenna 110 with a plurality of cellular devices (not shown), and interfaces with processor 106. Processor 106 is configured to control the radio circuit, and to transfer data between the antenna and, through network adapter 102, the TDM network. Processor 106 is further configured to receive times lot allocation for sending and receiving packets to or from the network. The timeslot allocation may be received from a processor that is not shown, through the network adapter or through any other means; in some embodiments the timeslot allocation is generated processor 106, which may send timeslot allocations to other nodes of the TDM network; in other embodiments, each processor of the network generates the timeslot allocation independently. The timeslots typically comprise transmit timeslots and receive timeslots, for transmitting and receiving packets, respectively.

Network Adapter 102 comprises an ingress port 112 that is configured to receive packets from the network; an egress ports 114 that is configured to send packets over the network; a time-based packet-steering unit 118 (which is also referred to as "packet processing circuitry"); and, a timed transmit queue 120.

Ingress port 112 receives packets from TDM network 104 and sends the packets to time-based packet-steering 118. The time-based packet-steering steers the packets according to rules, comprising conditions that the packet processor should check and actions that the packet processor should execute if the conditions are met. The conditions may comprise a time range and, optionally, some other conditions derived, for example, from the headers of the packet; the action may be, for example, forward the packet to processor 106 or, drop the packet and send a suitable notification to the processor.

In an embodiment, the time range condition is set responsive to the receive timeslot allocation that processor 106 sends to the network adapter. For example, if the receive timeslot allocation indicates that packets that are destined to the current TDM node 100 are received at the first 50 micro-second of every 1 milli-second cycle, the network adapter (or, in some embodiments, processor 106) will calculate, in each cycle, the start time and the end time during which the packet may be received. Time-based packet-steering 118 will thus be able to route to the processor only packets that are received within the allocated timeslot (in some embodiments, as no packets destined to processor 106 should be received outside the allocated ingress timeslot, packet-steering 118 does not check that the packet arrives at the allocated ingress timeslot). Aspects of time-aware packet steering are also addressed in U.S. patent application Ser. No. 16/782,075, filed Feb. 5, 2020, cited above.

Timed-Transmit-Queue 120 is configured to send packets over TDM Network 104 through Egress Port 114 according to the transmit timeslot allocation that processor 106 receives. In an embodiment, Timed-Transmit Queue 120 may comprise a plurality of queues for different packet flows (for example, each queue may be allocated to a separate virtual machine within processor 106), and each flow may be allocated a sub-timeslot within the timeslot allocated for TDM-node 100. The network adapter translates the timeslot allocation to a network time for the allocated timeslot, and Timed-Transmit-Queue sends a packet from one of the separate queues to the network through egress Port 114.

Network Adapter 102 further comprises a Time-Based Transmit-Blocking unit 122, which is configured to block transmission of packets outside the allocated timeslot. In some embodiments, processor 106 appends a start-time and an end-time indicator to some or all the egress packets; the Time-Based Transmit-Blocking unit compares the start-time and end-time indications to the present time, and blocks the transmission of packets before or after the allocated timeslot.

In some embodiments, network adapter 102 further comprises a network time circuitry (not shown) such as a Precision Time Clock (PTP), which used to accurately time the TDM timeslots. The network time circuitry will be described hereinbelow.

Thus, a TDM network such as that specified for the front-haul of eCPRI may be implemented using a network adapter attached to a processor; ingress packets that are received at pre-defined receive timeslots are directed to the radio circuit, and data from, the radio-circuit is packetized and sent over the network at predefined transmit timeslots. In embodiments according to the present invention, timeslots are checked by hardware and hence the processor does not have to check timeslots by polling, which would consume considerable computing resources, enforcing the processes to accurately synchronize in time.

Although the description above (and further descriptions hereinbelow) refer to network adapters, other types of network elements may be used in alternative embodiments, such as switches, routers and the like.

As would be appreciated, the configuration of TDM Node 100, including Network Adapter 102 are example configurations that are depicted purely for the sake of conceptual clarity. Other suitable configurations may be used in alternative embodiments of the present invention. For example, more network ports may be used, connecting to the same TDM network, to other TDM networks and/or to non TDM networks. In some embodiments, a single port is implemented. In other embodiments, bidirectional Ingress/Egress ports are used.

In an embodiment, the network adapter calculates network timeline values that correspond to the start and stop time of timeslots in a first TDM cycle, and thence calculates timeline values that correspond to the start and stop time of further TDM cycles by repeatedly adding the time duration of a TDM cycle to the start and stop time values (it should be noted that non-TDM queues may coexist with the TDM queues described herein above).

Time Synchronization

In some embodiments according to the present invention, the network adapter comprises a Precision Time Clock (PTP). PTP is defined in IEEE 1588-2008 "Standard for a Precision Clock Synchronization Protocol for Networked Measurement and Control Systems" (hereinafter "the 1588") and comprises a hierarchical master-slave architecture for clock distribution. Under this architecture, a timeline distribution system consists of one or more communication media (network segments), and one or more clocks which are continuously synchronized to each other. Thus, the PTP timeline value can be adjusted to the network timeline. The PTP timeline value is typically an 80-bit integer, comprising a day field (days from Jan. 1, 1970. Midnight) and a nanosecond field In embodiments, a software PTP client, typically running on the processor, keeps a "wall clock" by continuously reading the network timeline from the network adapter. The PTP client may send commands such as "adjust time", "set time" and "read time" to the PTP circuitry. The PTP circuitry comprises an adjustable oscillator, a counter and synchronization circuits to support such commands.

Fluctuation of the adjustable oscillator are measured, calculated and then mitigated by readjusting the oscillator frequency (e.g., by changing the n and m values of a PLL and/or by changing the voltage input to a voltage-controlled oscillator (VCO)).

In some embodiments, the network adapter further comprises a circuitry that generates timestamps at a time when an egress packet exits the network adapter, and, at a time when an ingress packets enters the network adapter; the network adapter then sends the timestamps to the PTP client, which uses the timestamps for the calculation of the network propagation delay from the network adapter to a peer network element that comprises the network timeline ("master timeline").

In order to discipline a clock (that is—make it track the frequency and phase of a master clock), a PTP client continuously:

Exchanges packets with a network element that comprises the master clock;
Extracts the master timeline from the ingress packets;
Measures the network delays using timestamps associated with the exchanged packets;
Adjusts the time according to the master timeline and to the delays, calculates the drift of the oscillator frequency (e.g., by dividing the time drift by the elapsed time from the previous measurement); and
Adjusts the oscillator to mitigate the measured frequency drift.

Figure 2:
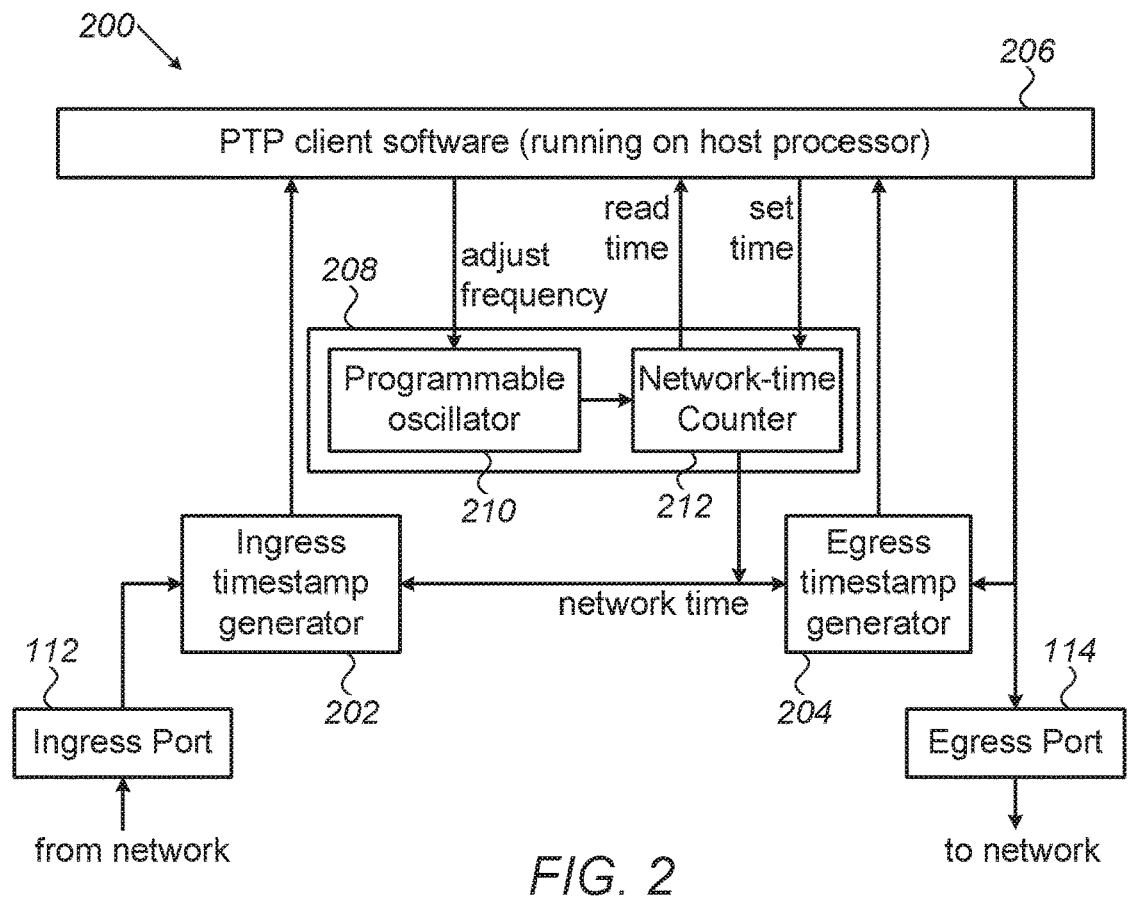
FIG. 2 is a block diagram that schematically illustrates Precision Time Protocol (PTP) support circuits 200 in accordance with embodiment of the present invention.

FIG. 2 is a block diagram that schematically describes PTP support circuits 200 in accordance with embodiment of the present invention. The support circuits connect to an Ingress port 112 and an egress port 114 (FIG. 1) that communicate with the network. PTP support circuits 200 comprise an ingress timestamp generator 202, configured to generate precise timestamps when packets from the network enter the network adapter, an Egress timestamp generator 204, configured to generate precise timestamps when packets from the network adapter are output to the network, a PTP Client Software 206, and a PTP Circuitry 208. PTP Client Software 206 typically runs on processor 106. Timestamp generators 202 and 204 and PTP Circuitry 208 are typically part of network adapter 102 in FIG. 1.

PTP Circuitry 208 comprises a programmable oscillator 210 (e.g., a high-precision Phase-Locked-Loop (PLL), a Voltage-Control Oscillator (VCO), or a combination of a PLL and a VCO) and a network-time counter 212, which counts the oscillator cycles in nanoseconds and days. In an embodiment, the counter comprises 80 bits. The PTP circuitry relays the counter value to ingress timestamp generator 202 and egress timestamp generator 204, to synchronize the timestamps to the network timeline.

The PTP client software is configured to:
i. Communicate packets with a peer network element that comprises the network timeline;
ii. Receive timestamps from timestamp generators 202 and 204, which pertain to the precise ingress and egress time of the packets;
iii. Calculate the oscillator drift and adjust the programmable oscillator frequency accordingly.
iv. Measure/Calculate the propagation delay;
v. Calculate the precise time and set counter 212 accordingly;

In embodiments, to further increase the PTP accuracy, the network adapter compensates for internal pipeline delays when using the PTP timeline. This can be done by routing the PTP time through a pipeline with a matching delay, or by adding/subtracting the difference in pipeline delay to counter 212.

Thus, according to the example embodiment illustrated in FIG. 2, network adapter 102 can keep a time counter synchronized to a remote network timeline.

The configuration of PTP support circuits 200, shown in FIG. 2, is an example configuration that is shown purely for the sake of conceptual clarity. Any other suitable configurations can be used in alternative embodiments. For example, the network-time counter may count in other resolutions or may be divided to other fields; part or all the client software functions may be implemented in specialized circuitry (rather than by processor 102), the timestamp that ingress timestamp generator 202 generates may be concatenated to the corresponding ingress packet (e.g., as a header), and, the frequency drift measurement and adjustment may be split to a coarse part and a fine part.

Figure 3:
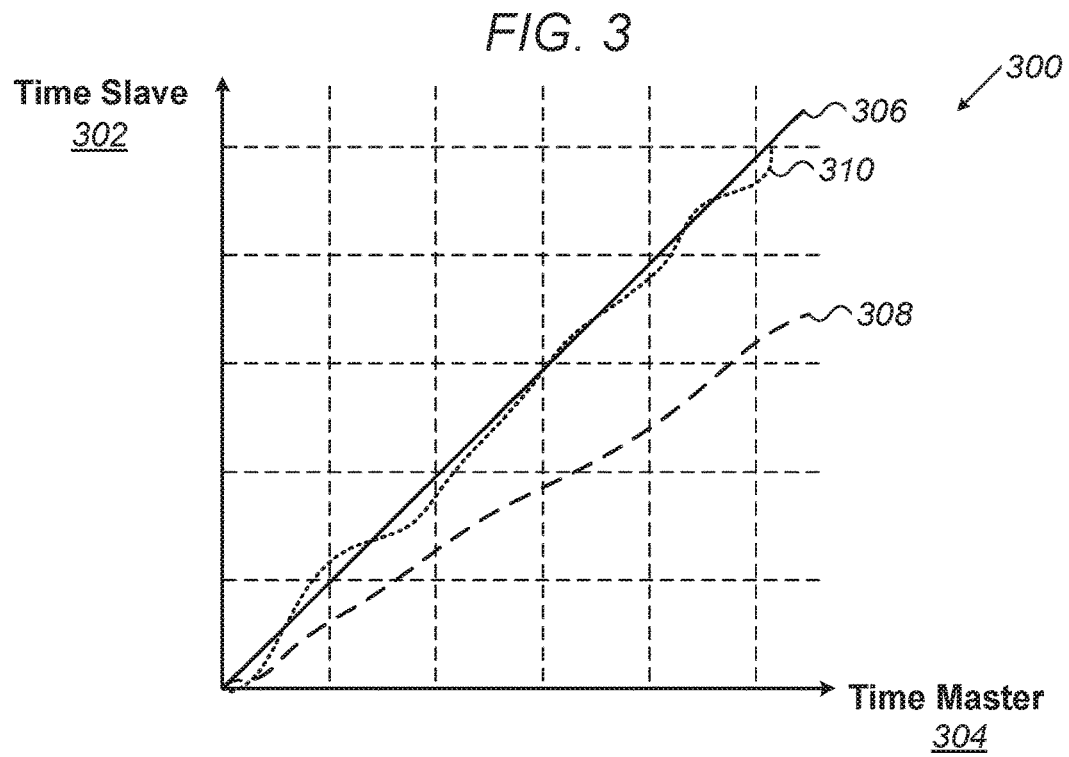
FIG. 3 is a graph that schematically illustrates values of PTP counters, in accordance with an embodiment of the present invention.

FIG. 3 is a graph 300 that schematically illustrates the values of the PTP counters, in accordance with an embodiment of the present invention. A vertical time axis 302 represents the time at the network adapter ("slave"), and a horizontal time axis 304 represents the network timeline ("master"). A 45-degrees Graph 306 shows the ideal case, wherein the slave clock exactly follows the master clock. A curve 308 represents the master to slave relationship if there is no Syntonization—the gap between graph 306 and graph 308 continuously widens. Graph 310 represents the master to slave relationship with synchronization. As can be seen, the slope of graph 310 is adjusted when a deviation is detected; as the corrected frequency continues to drift, the slope is corrected again, so that a good match is achieved. When time deviation is measured, the PTP client, does not set the PTP time to the network time that the PTP client calculates (by subtracting the propagation delay from the received network time), as such settings may cause non-continuity in graph 310; instead, the slope of graph 310 is modified so that graph 310 will cross graph 306. In alternative embodiments, the PTP client may occasionally set the time.

Figure 4:
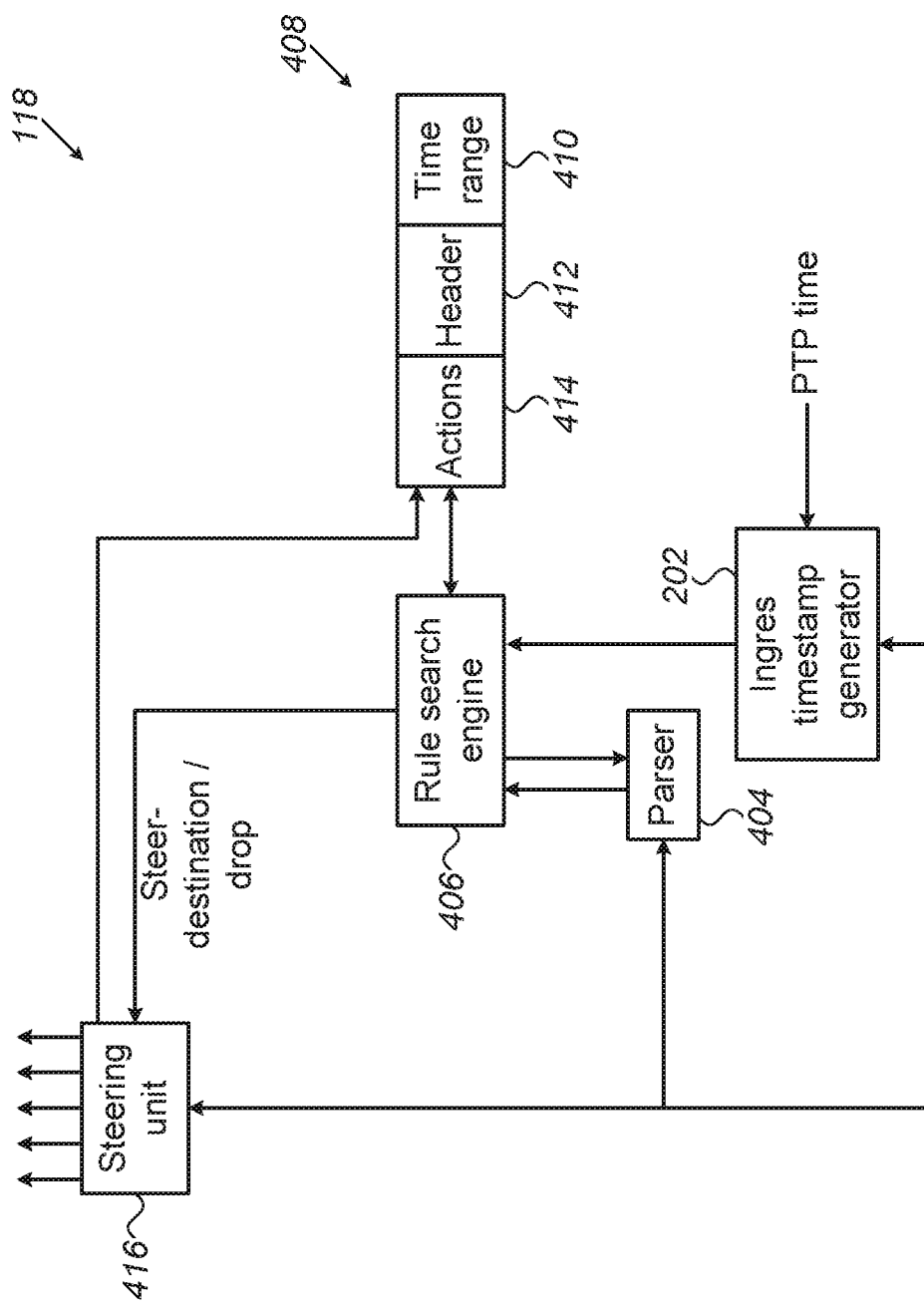
FIG. 4 is a block diagram that schematically illustrates time-based ingress packet processing in a network adapter, accordance to embodiments of the present invention.

FIG. 4 is a block diagram that schematically describes time-based ingress packet processing (also referred to as "packet processing circuitry") in a network adapter, in accordance to embodiments of the present invention. Time based packet processing 118 (also illustrated in FIG. 1) comprises an ingress timestamp generator 202 (FIG. 2), which is configured to generate precise timestamps when packets are input to the network adapter (according to a PTP time input, generated by the network time circuitry, that is not shown), a Parser 404, which is configured to extract the headers of the ingress packets, a rule-search-engine 406; a search table 408 and a steering unit 416.

Search Table 408 comprises a time-range field 410, header field 412 and an action field 414. Each entry of search table 408 comprises a time-range entry, a single header entry and a single action entry. The header entry may comprise 1, 0 and X (don't care) bits. The time-range field may comprise, for example, an upper limit and a lower limit; and the action field comprises steering information for the packet (and, in some embodiments, other actions, e.g., security-related). In some embodiments, table 408 is stored in a Ternary Content-Addressable memory (TCAM); in other embodiments, the table is stored using a hash function in a Random Access Memory (RAM); and, in yet, other embodiments, table 408 is stored in a combination of RAM and TCAM.

Rule-search-engine 406 receives the packet header from parser 404 and the ingress timestamp from the ingress timestamp generator. The rule-search engine communicates with rule-table 408, and searches for a match to the timestamp and the packet header in the table. Rule-search-engine 406 may comprise a finite-state-machine, searching for a rule match in one or more clock cycles, or a single cycle match engine.

If the rule-search-engine finds a matching rule to the packet header/timestamp, the rule-search-engine may send to steering unit 416 steering information for the packet; if no matched rule is found, the rule-search-engine may send a drop indication to the steering unit, so that a packet that is not received in the allocated timeslot will be ignored. For example, if the timeslot allocation defines that the network adapter receives packets during a predefined timeslot, rule table 408 may comprise an entry that defines an allowed time-range corresponding to the allocated time-slot, and an action field that directs the steering unit to forward the packet to a predefined virtual machine.

Steering Unit 416 receives the Ingress packets from the ingress port and a corresponding action from rule-search-engine 406 and executes the action. For example, steering unit 416 may forward the packet to one of a plurality of output queues, wherein each output queue is associated with a separate virtual machine. Typically, if the time indicated by the timestamp is not within the allocated timeslot, the steering unit will receive a Drop action for the rule search engine and ignore the packet; in some embodiment the steering unit may such packets to a default queue, configured to handle non-TDM traffic.

In some embodiments, the packet steering operation may be sequential, consuming several cycles during which different parts of the packet header are parsed, and different rules are searched for. To that end, Rule Search Engine 406 is further configured to control Parser 404 to parse different header fields at different cycles, and Steering Unit 406 is further configured to control the access to Rule-Table 408, so as to send different rules to the Rule-Search engine.

Thus, according to the example embodiment illustrated in FIG. 4, network adapter 102 receives TDMA communication from the network; a rule-search engine compares the timestamp generated when the network adapter receives the packet with a range that corresponds to the allocated timeslot, and determines a suitable packet action—e.g., ignore the packet if the timestamp is not within the allocated timeslot, or steer the packet to a destination derived from fields in the packet header.

The configuration of time-based ingress packet processing 118, shown in 4, is an example configuration that is shown purely for the sake of conceptual clarity. Any other suitable configurations can be used in alternative embodiments. For example, in some embodiments, a relative time may be used, to reduce the interactions with the processor: i) the time range field defines a relative time measured from the beginning of the TDMA cycle; ii) the network adapter comprises a TDMA-start-time register, which stores the network time of the start of the current TDMA cycle and increment in every TDMA cycle by the duration of the TDMA cycle; and, iii) the rule-search engine subtracts the TDMA-start-time register value from the timestamp, and searches the rule table with the difference.

In an embodiment, the network adapter comprises separate search circuitries for the timestamp and for the steering rules, which may work concurrently or serially; in an embodiment, the searches are pipelined.

In some embodiments, the network adapter may additionally or alternatively modify packet contents based on the time of arrival.

Packet Pacing

Aspects of Packet pacing techniques are described, for example, in U.S. patent application Ser. No. 16/430,457, filed Jun. 4, 2019, which is assigned to the assignee of the present patent application and whose disclosure is incorporated herein by reference. In a typical packet pacing mechanism, a credit allocation circuitry, with a pico-second resolution sends credits to send bits of information to various queues. A queue will output a pending packet only if the number of credits that the queue has is more than the total number of bits of the pending packet. The credit allocation circuitry sends credits to the queues according to bandwidths that are allocated to the queues and according to the elapsed time. For example, if the credit allocation circuitry is invoked every 10 micro-seconds and one of the queues is allocated a 200 Mbps bandwidth, the credit allocation circuitry will send to the queue 2000 credits whenever the credit-allocation circuitry is invoked.

In an embodiment, the credit allocation circuitry is coupled to the PTP clock of the network adapter, and, thus, closely follows the network clock.

By sending evenly spaced fixed duration dummy packets, the network adapter will generate equally spaced completion queue entries (CQEs) that correspond to the dummy packets and comprise unique Producer Indexes (PIs). For example, if the processor sends 64-byte dummy-packets at a rate which is continually adjusted to 128,000,000 byte per second, a CQE will be generated every 500 nanoseconds. As each generated CQE has a corresponding PI, there is a one-to-one correspondence between the PI and the PTP time of the network adapter.

Figure 5:
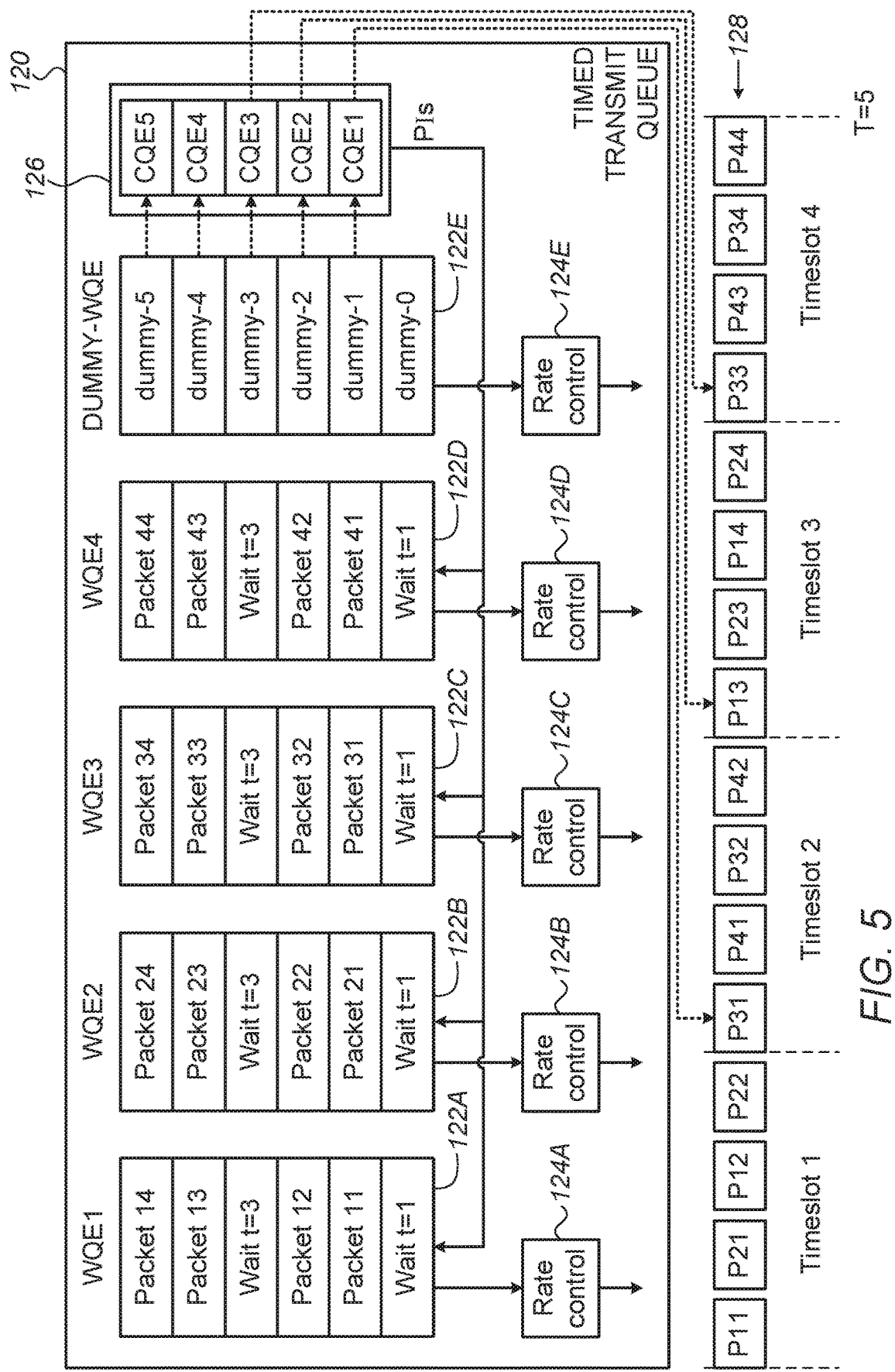
FIG. 5 is a block diagram that schematically illustrates timed transmission of packets from a network adapter, in accordance with embodiments of the present invention.

FIG. 5 is a block diagram that schematically illustrates timed transmission of packets from a network adapter, in accordance with embodiments of the present invention. Timed-Transmit Queue 120 (FIG. 1) comprises Write-Queue-Entry (WQE) queues 122A through 122D, a dummy-WQE 122E, and rate control units 124A through 124E. Dummy-WQE 122E comprises dummy packets, which are not necessarily egress from the network adapter but generate completion queue entries, that are sent to a dummy CQE queue 126, comprising CQE entries, wherein each CQE entry comprises the producer index (PI) values that the network adapter assigns to the dummy packets. As explained above, the length of the dummy entries and the controlled rate of dummy-WQE 122E are such that dummy-CQE entries will be generated at equal time intervals; as each CQE comprises a separate PI, there a one-to-one correspondence between the PI and the time at which the dummy packets would exit the network adapter (as described above, the dummy packets are not sent to the network).

In the example embodiments illustrated in FIG. 5, each WQE queue 122A through 122D comprises, in addition to queue entries, Wait commands, which instruct the queue (or, more precisely, a selector that is not shown, configured to extract entries from the WQE queues and send the corresponding packets) to wait until the PI extracted from the dummy-COE queue matches the time of the allocated timeslot. The Walt commands may comprise time parameters, or a PI value.

Timing flow 128 illustrates the timed egress of packets from, the network adapter. According to the example embodiment illustrated in FIG. 5, the timeslots allocated for network element 102 cover most of the TDMA cycle (as would be evident, in typical embodiments this will not be the case). The network adapter sends packets from WQE1 and WQE2 in odd timeslots, and packets from WQE3 and WQE4 in even timeslots. In some embodiments, additional circuitry of timed-transmit-queue 120 further guarantees that no packets will be transmitted outside the allocated transmit timeslot.

In summary, the timed-transmit-queue of network adapter 102 comprises WQE queues for transmitting packets over the network, the queues comprising WQE entries and Wait entries. An additional dummy-packet WQE queue is operable to transmit evenly spaced dummy packets, and receive a corresponding every spaced CQE queue, which comprises PIs. The WOE queues do not send the stored packets until the Walt commands are executed—that is, until a PI which correspond to the time indicated the wait command is received.

As would be appreciated, the configuration of timed-transmit queue 120, shown in FIG. 5, an example configuration that is shown purely for the sake of conceptual clarity. Any other suitable configurations can be used in alternative embodiments. For example, in some embodiments, wait commands are not embedded in WQE1 through WQE4; rather, a circuitry in the timed-transmit queue receives wait parameters from the processor (one per queue, or one for a plurality of queues), and disables the output of the corresponding queue until the wait parameter matches the PI that the dummy-QE outputs. The Wait parameters may be specified in time-units or in PI units; in some embodiments, incremental rather than absolute PI or time values may be used. The number of WQE queues may vary and some or all the rate control units may be aggregated.

Figure 6:
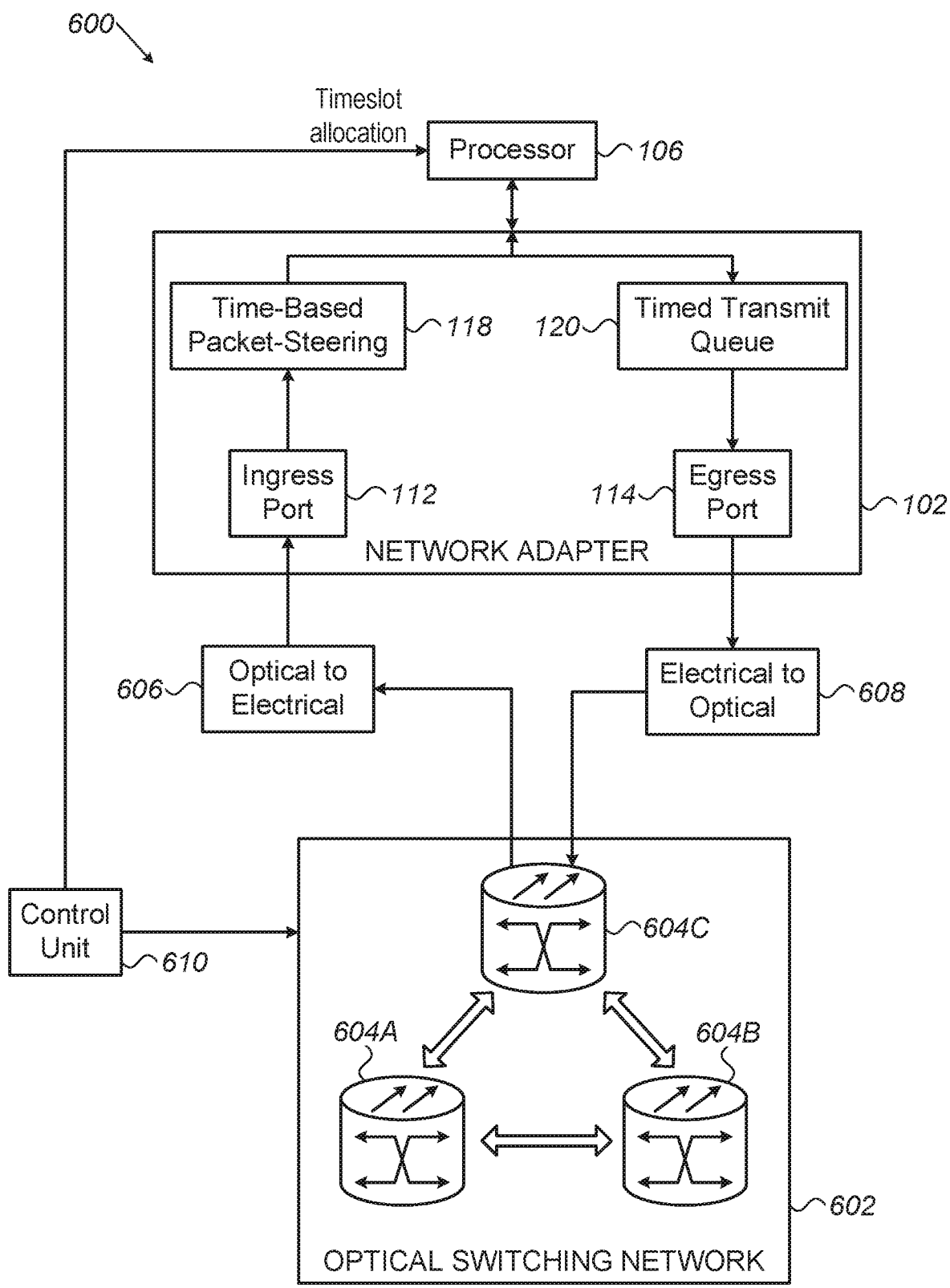
FIG. 6 is a block diagram that schematically illustrates an optical-switching system, in accordance with an embodiment of the present invention.

FIG. 6 is a block diagram that schematically illustrates an optical-switching system 600, in accordance with an embodiment of the present invention. The optical switching system may be, for example, a high-performance datacenter, comprising a plurality of processors, interconnected by a fast optical-switching network 602.

Typically, in optical switching networks, routing cannot be done based on packet headers, because the packets are not analyzed in the optical medium (to avoid optical-electrical conversion and processing delays). Instead, a TDMA protocol is used, and in each TDMA timeslot the optical switching network establishes optical links from a set of input ports to a set of output ports, e.g., establishes and tears down circuit connections over time according to predefined or real-time calculated schedule. (This is different from non-optical datacenter networks, which implement packet switching rather than circuit switching.)

According to the example embodiment illustrated in FIG. 6, optical-switching network 602, comprises a plurality of optical switches 604 (three optical switches 604A, 504E and 604C are illustrated in the example embodiment of FIG. 6; any other suitable number can be used in alternative embodiments). The optical switches are interconnected by optical links that transfer light modulated by packet data. Some or all the optical switches may also be coupled to processors, or to additional optical switching networks.

A Control Unit 610 is configured to allocate timeslots to the optical switches and to the coupled processors, according to a preset schedule or to a real-time calculated schedule generated by a scheduler; in some embodiments the scheduler may be embedded in the control unit; in other embodiments the scheduler is external to the control unit which may or may not reside at the control unit.

In the example embodiment illustrated in FIG. 6, optical switch 604C is coupled through an Optical-to-Electrical interface 606 to ingress port 112 of network adapter 102 (FIG. 1), and through Electrical-to-Optical interface 608 to egress port 114. Processor 106 receives ingress timeslot allocation from control unit 106 and sets time-based packet-steering 118 to receive packets at the allocated timeslots (as was described with reference to FIG. 4). Likewise, the processor receives egress timeslot allocation from the control unit and sets the time-based queue to transmit packets at the allocated timeslots (as was described with reference to FIG. 5).

The configuration of optical-switching system 600, shown in FIG. 6, is an example configuration that is shown purely for the sake of conceptual clarity. Any other suitable configurations can be used in alternative embodiments, including, for example, systems with multiple optical switching networks and hybrid systems with optical and electrical switching networks. Control Unit 610 may be implemented as a software program running on a processor (which may be dedicated to controlling the optical network or shared with other functions).

In some embodiment, unidirectional communication is implemented, optical switch 604C is split to two unidirectional switches, wherein Electrical-to-Optical interface 608 is coupled to an egress optical switch, and Optical-to-Electrical interface 606 is coupled to an ingress optical switch.

In the descriptions hereinabove, techniques to implement TDM and TDMA networks using network adapters (or, in general, network elements) have been disclosed; two example applications were demonstrated—eCPRI and Optical Switching systems. As would be appreciated, the disclosed techniques are in no way limited to eCPRI and Optical Switching system. Any other suitable application may be used in alternative embodiment, including, for example, Video-over-IP.

The different components of the network elements described herein, e.g., of network adapter 102 (FIGS. 1 and 6), PTP support circuits 200 (FIG. 2), and/or time-based packet-steering unit 118 (FIG. 4), may be implemented using suitable hardware, such as in one or more Application-Specific integrated Circuits (ASICs) or Field-Programmable Gate Arrays (FPGAs), using software, using hardware, or using a combination of hardware and software elements.

In some embodiments, processor 106 comprises a general-purpose processor, which is programmed in software to carry out the functions described herein. The software may be downloaded to the processor in electronic form, over a network or from a host, for example, or it may, alternatively or additionally, be provided and/or stored on non transitory tangible media, such as magnetic, optical, or electronic memory.

Although the embodiments described herein mainly address network adapters, the methods and systems described herein can also be used in other applications, such as in network switches.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
one or more network ports configured to communicate with a communication network;
network time circuitry, configured to track a network time defined in the communication network; and
packet processing circuitry, configured to:
generate a series of evenly spaced entries including time stamps from the network time circuitry;
receive indications of packets to be transmitted along with a definition of timeslots assigned to transmission of the indicated packets; and
send outbound packets to the communication network in accordance with the received indications and assigned timeslots, at times responsive to the entries of the generated series.

2. The network element according to claim 1, wherein the timeslots comprise a plurality of timeslots that are assigned to the network element in a periodic time schedule that is synchronized to the network time.

3. The network element according to claim 1, wherein the packet processing circuitry is configured to send the outbound packets only during the assigned timeslots.

4. The network element according to claim 1, wherein the packet processing circuitry is configured to generate the series of evenly spaced entries by generating a series of evenly spaced dummy packets, and generating completion queue entries including time stamps from the network time circuitry, responsive to the dummy packets.

5. The network element according to claim 4, wherein the dummy packets do not egress the network element.

6. The network element according to claim 4, wherein the series of evenly spaced dummy packets comprises fixed duration dummy packets.

7. The network element according to claim 1, wherein the network ports are configured to send the outbound packets to a wireless network operating in Time-Division Multiple Access (TDMA).

8. The network element according to claim 1, wherein the network ports are configured to send the outbound packets to an optical switching network operating in Time-Division Multiple Access (TDMA).

9. The network element according to claim 1, wherein, in addition to sending the outbound packets depending on the timeslots, the packet processing circuitry is configured to send additional packets to the communication network independently of the timeslots.

10. The network element according to claim 1, wherein the outbound packets comprise Ethernet packets or Infiniband packets.

11. The network element according to claim 1, wherein the packet processing circuitry receives the indications of the packets to be transmitted in queues, which further include wait commands which indicate the assigned timeslots.

12. The network element according to claim 1, further comprising a time-based circuitry that blocks any packet that the egress circuitry may attempt to send to the network outside the allocated timeslot.

13. A network element, comprising:
one or more network ports configured to communicate with a communication network;
network time circuitry, configured to track a network time defined in the communication network; and
packet processing circuitry, configured to:
receive a definition of one or more timeslots that are synchronized to the network time; and
process inbound packets, which are received from the communication network, depending on the respective timeslots in which the inbound packets were received.

14. The network element according to claim 13, wherein the packet processing circuitry is configured to process an inbound packet only if an arrival time of the inbound packet is during the one or more timeslots.

15. A network element, comprising:
one or more network ports configured to communicate with a communication network;
network time circuitry, configured to track a network time defined in the communication network; and
packet processing circuitry, configured to:
queue outbound packets in one or more queues;
assign credits to the queues depending on the network time; and
transmit the outbound packets to the communication network in accordance with the assigned credits.

16. A network element, comprising:
one or more network ports configured to communicate with a communication network;
network time circuitry, configured to track a network time defined in the communication network; and
packet processing circuitry, configured to:
receive inbound packets from the communication network;
determine times-of-arrival of the inbound packets, in accordance with the network time; and
distribute the inbound packets to multiple queues based on the times-of-arrival.

* * * * *